US012646893B2

(12) United States Patent
Wolfschmitt et al.

(10) Patent No.: US 12,646,893 B2
(45) Date of Patent: Jun. 2, 2026

(54) ELECTRICAL HIGH-CURRENT CONNECTOR

(71) Applicant: TE Connectivity Germany GmbH, Bensheim (DE)

(72) Inventors: Heiko Wolfschmitt, Bensheim (DE); Richard A. Forell, Bensheim (DE); Joachim Schneider, Bensheim (DE); Walter Saenger, Bensheim (DE); Thomas Hulbert, Bensheim (DE); Wolfgang Balles, Bensheim (DE); Manuel Eheim, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 219 days.

(21) Appl. No.: 18/451,349

(22) Filed: Aug. 17, 2023

(65) Prior Publication Data

US 2024/0063584 A1 Feb. 22, 2024

(30) Foreign Application Priority Data

Aug. 17, 2022 (DE) ......................... 102022120762.5

(51) Int. Cl.

*H01R 13/621* (2006.01)
*H01R 13/52* (2006.01)
*H01R 13/629* (2006.01)
*H01R 13/6583* (2011.01)

(52) U.S. Cl.

CPC ..... *H01R 13/6583* (2013.01); *H01R 13/5213* (2013.01); *H01R 13/621* (2013.01); *H01R 13/62938* (2013.01)

(58) Field of Classification Search

None

See application file for complete search history.

(56) References Cited

U.S. PATENT DOCUMENTS 4,202,591 A 5/1980 Borgstrom
5,804,770 A 9/1998 Tanaka
7,572,150 B2 8/2009 Matsuoka
(Continued)

FOREIGN PATENT DOCUMENTS

CN 1157494 A 8/1997
CN 107611636 A 1/2018
(Continued)

OTHER PUBLICATIONS

Extended European Search Report dated Jan. 17, 2024, corresponding to Application No. 23191622.2-1201, 11 pages.
(Continued)

*Primary Examiner* — Tho D Ta
(74) *Attorney, Agent, or Firm* — Barley Snyder

(57) ABSTRACT

An electrical connector includes an electrically insulating connector housing, at least one electromagnetically shielded contact device including an electromagnetic shield, at least one clamping screw, and an electrically insulating protective cap. The at least one clamping screw mechanically secures an electrical contact of the contact device. The electrically insulating protective cap is provided at or on the connector housing, and electromagnetically closes at least one shielding hole defined in the electromagnetic shield of the contact device.

20 Claims, 5 Drawing Sheets

(56) References Cited

U.S. PATENT DOCUMENTS

| | | | | |
|---|---|---|---|---|
| 9,048,551 | B2 | 6/2015 | Picaud et al. | |
| 9,847,593 | B2 * | 12/2017 | Nunner | H01R 13/42 |
| 2012/0231676 | A1 | 9/2012 | Picaud et al. | |
| 2018/0366713 | A1 | 12/2018 | Nakayama et al. | |
| 2023/0084743 | A1 | 3/2023 | Wolfschmitt et al. | |

FOREIGN PATENT DOCUMENTS

| | | | | |
|---|---|---|---|---|
| CN | 207207759 | U | 4/2018 | |
| CN | 108604661 | A | 9/2018 | |
| CN | 207818929 | A | 9/2018 | |
| CN | 106785766 | B | * 12/2018 | H01R 13/52 |
| CN | 110611201 | A | * 12/2019 | H01R 13/02 |
| CN | 112134063 | A | * 12/2019 | H01R 13/6585 |
| CN | 212587683 | U | 2/2021 | |
| CN | 113330648 | A | * 8/2021 | H01R 11/12 |
| CN | 113785451 | A | * 12/2021 | H01R 13/6583 |
| CN | 114204363 | A | * 3/2022 | B60L 53/16 |
| DE | 102014216281 | A1 | 2/2016 | |
| DE | 102015216545 | A1 | 3/2017 | |
| DE | 102017221845 | A1 | * 2/2019 | H01H 85/202 |
| DE | 102021208929 | A1 | 2/2023 | |
| DE | 102021123635 | A1 | 3/2023 | |
| EP | 3145034 | A2 | 3/2017 | |
| JP | 2004127965 | A | 4/2004 | |
| JP | 2009032500 | A | 2/2009 | |
| JP | 2012256573 | A | 12/2012 | |
| JP | 2013511800 | A | 4/2013 | |
| WO | 2011055768 | A1 | 5/2011 | |
| WO | 2014048929 | A1 | 4/2014 | |
| WO | 2014096881 | A1 | 6/2014 | |
| WO | 2021089522 | A1 | 5/2021 | |
| WO | 2023020799 | A1 | 2/2023 | |

OTHER PUBLICATIONS

German Office Action dated Mar. 21, 2023, corresponding to Application No. 10 2022 120 762.5, 6 pages.

Japanese Office Action dated Nov. 12, 2024 with English translation, corresponding to Application No. 2023-131756, 12 pages.

Korean Office Action dated Dec. 5, 2024 with English translation, corresponding to Application No. 10-2023-0106264, 11 pages.

Indian Examination Report dated Nov. 28, 2025, corresponding to Application No. 202344054501, 6 pages.

* cited by examiner

ELECTRICAL HIGH-CURRENT CONNECTOR

CROSS-REFERENCE TO RELATED APPLICATION

This application claims the benefit of German Patent Application No. 102022120762.5, filed Aug. 17, 2022, the whole disclosure of which is incorporated herein by reference.

FIELD OF THE INVENTION

Embodiments of the present disclosure relate to a high-current connector for a high-current line consisting of copper or aluminum, particularly for the automotive sector. The disclosure also relates to an assembled electrical high-current connection and to a power-electrical entity, particularly in each case for the automotive sector.

BACKGROUND

In the electrical sector (electrics, electrical engineering, electrical power engineering etc.) beyond ground-based electrical power engineering and its analogues, a large number of electrical high-current connectors serve the purpose of transmitting electrical currents and voltages in the medium-current or high-current and/or medium-voltage or high-voltage range. In this case, the high-current connectors, for example for supplying and/or distributing electrical energy in warm, possibly hot, contaminated, humid and/or chemically aggressive environments, must ensure problem-free transmission of electrical energy over their service life.

Such high-current connectors can be installed, for example, on/in an electrical entity, for example, a rechargeable battery or a rechargeable battery module, a traction battery or a traction battery module, an inverter, a switchgear assembly etc. Efforts to reduce environmental impact and high fuel costs make, for example in the automotive sector, hybrid or electric vehicles necessary. One aspect of these vehicles is handling of high electrical charging and operating currents and/or voltages, wherein the components in question of the vehicles need to designed correspondingly. This relates, for example, to high-current/high-voltage lines (for example stranded lines, conductor bars, busbars, etc., consisting of copper or preferably aluminum) and contact means (for example connection pieces, flat contacts, busbars etc. consisting of aluminum or preferably copper) of the high-current connectors.

In order to make electrical contact with an entity by means of a high-current connector, it is possible to use electromechanical screw contact connections which also meet stringent requirements. A mechanical path can be functionally separated from an electrical path by means of such a high-current screw contact connection. The mechanical path serves to transmit the mechanical tensile stresses of a screw fitting, in particular a steel-steel screw fitting, and the electrical path is used as a low-resistance electrical contact connection, in particular a copper-copper connection, of the high-current screw contact connection by means of the high-current connector.

As a result, a robust and, in a typical manufacturing environment, easily handleable electrical high-current connection is provided. In addition, such a high-current connection is easily separable (diagnosis, repair, recycling) and at the same time safe to touch. Such high-current connections can be used in a variety of ways and flexibly for making contact with battery modules and for other connecting points in various connection panels of an electrical power architecture. Efforts are continually being made to improve these electrical high-current connectors, in particular to design them to be more effective and in the process to make them cost-effective. It is therefore an object of the disclosure to specify an improved high-current connector.

SUMMARY

According to an embodiment of the present disclosure, an electrical connector includes an electrically insulating connector housing, at least one electromagnetically shielded contact device including an electromagnetic shield, at least one clamping screw, and an electrically insulating protective cap. The at least one clamping screw mechanically secures an electrical contact of the contact device. The electrically insulating protective cap is provided at or on the connector housing, and electromagnetically closes at least one shielding hole defined in the electromagnetic shield of the contact device.

BRIEF DESCRIPTION OF THE DRAWINGS

The invention will now be described by way of example with reference to the accompanying Figures, of which.

DETAILED DESCRIPTION OF THE EMBODIMENTS

Figure 1:
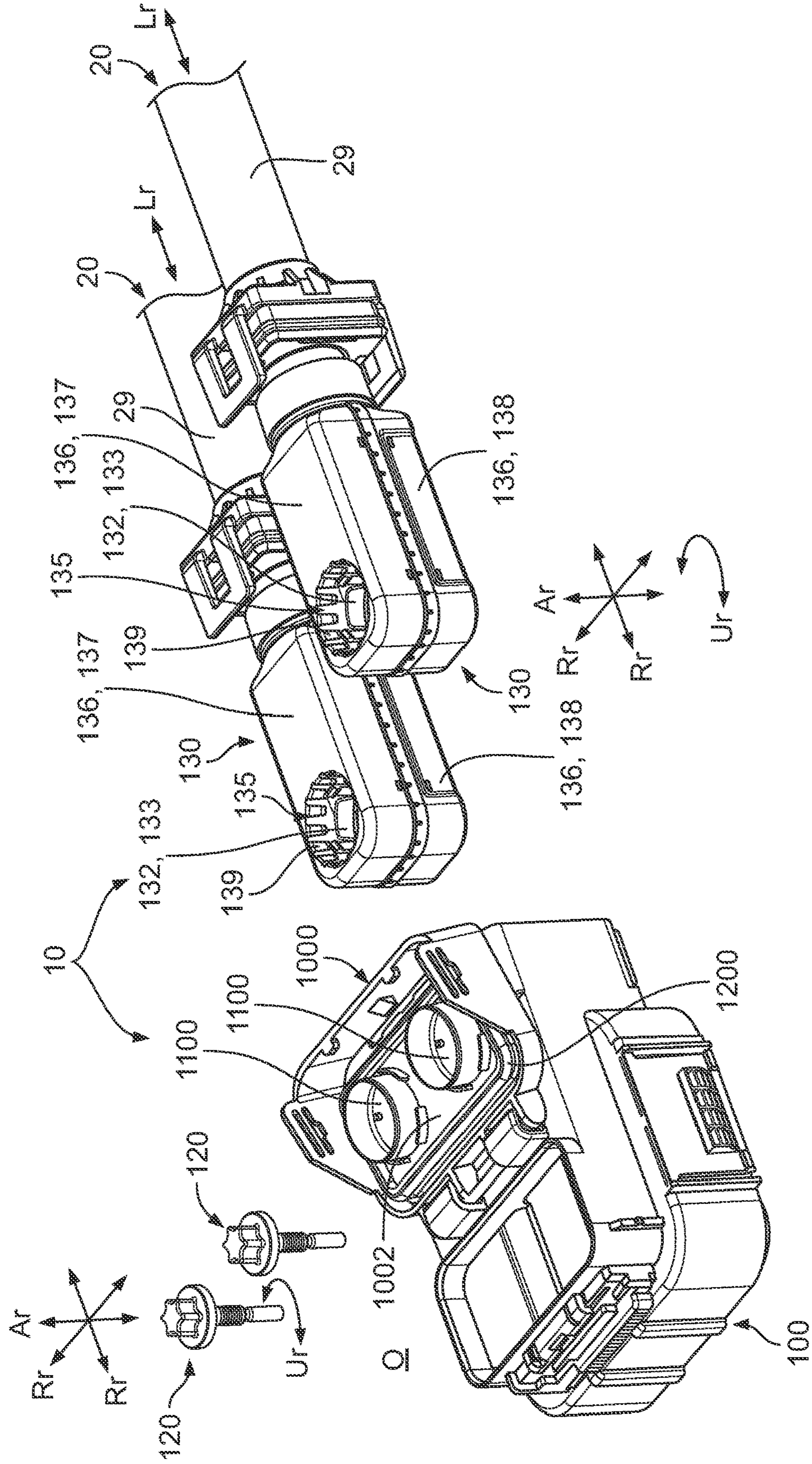
FIG. 1 shows a perspective exploded view of an electrical high-current connector and high-current lines according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Traction batteries are indispensable parts of an electrification of the drive trains of hybrid or electric vehicles. Such batteries consist of many individual cells which are each combined to form battery modules. All of the electrical energy during the operating modes of charging, traveling and recuperation must safely flow into the battery or be able to be removed from the battery via high-current connections of these battery modules. Therefore, such high-current connections and their high-current contact connections must be capable, under constricted conditions in terms of physical space, of conducting permanent currents of up to 600 A and in the future even above this for several minutes during a high-power charging cycle. Further, while in dynamic drive modes, they need to carry much higher currents for seconds (at least +175% to possibly over +500%). The same applies to the electrical voltages.

In addition, such a high-current contact connection of a battery module provides a physical layer for battery protection (overtemperature protection), battery management (states of charge), cell balancing (charge balancing between battery modules), mechanical protection, etc. For this purpose, a contact connection of each individual battery module which has good fatigue strength but is preferably detachable is required. Such a contact connection not only needs to be configured as an integrated system for the life of the vehicle but also needs to be robust in such a way that vibrations and temperature influences do not influence the mechanical and electrical properties of the contact connection to an impermissible extent over the life. In addition, this contact connection needs to be safe to touch in order that no risk is posed by high electrical currents and/or voltages in a high-voltage system such as the electrified vehicle.

Figure 2:
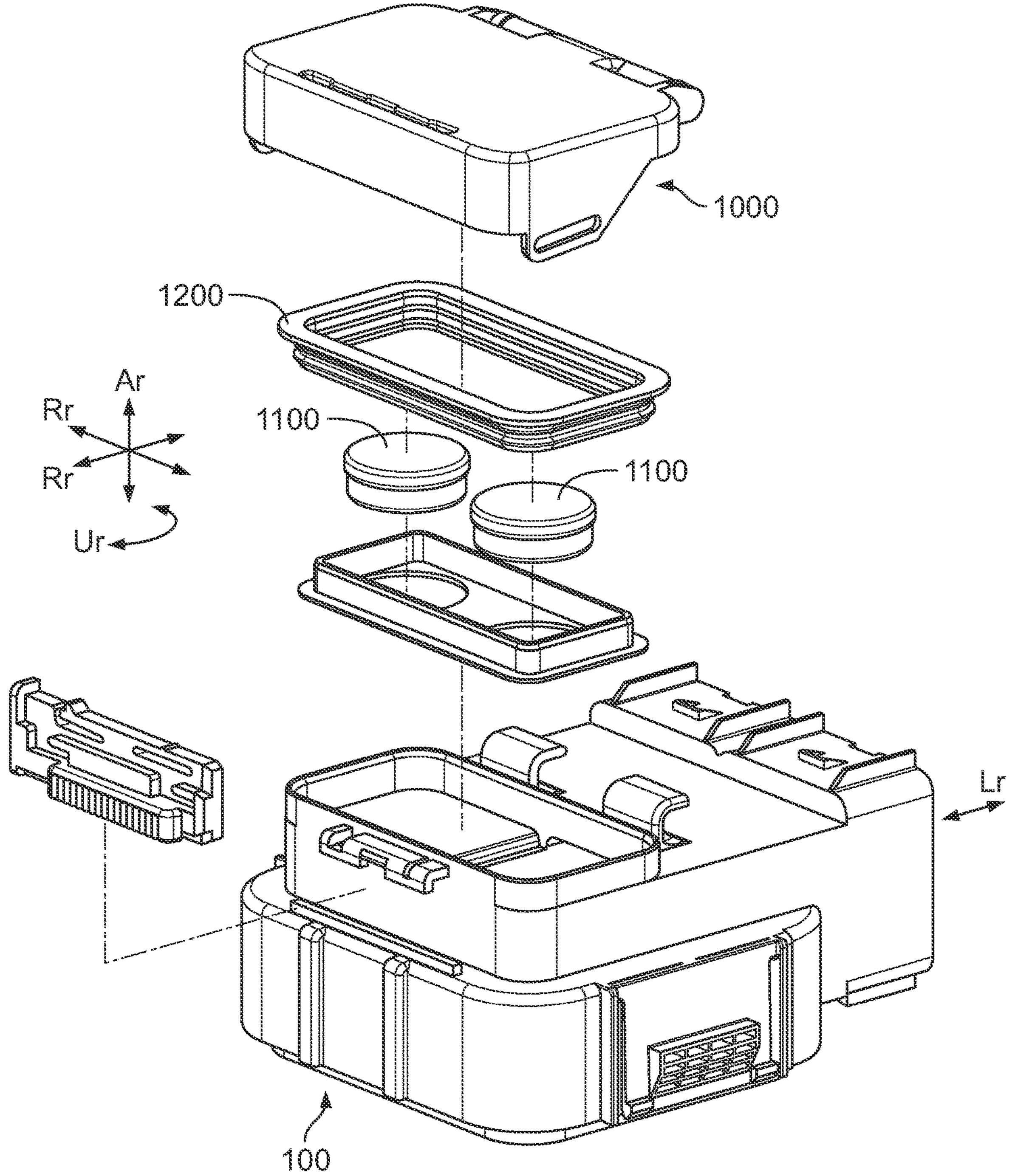
FIG. 2 shows a perspective exploded view of a connector housing for the high-current connector of FIG. 1.
Figure 3:
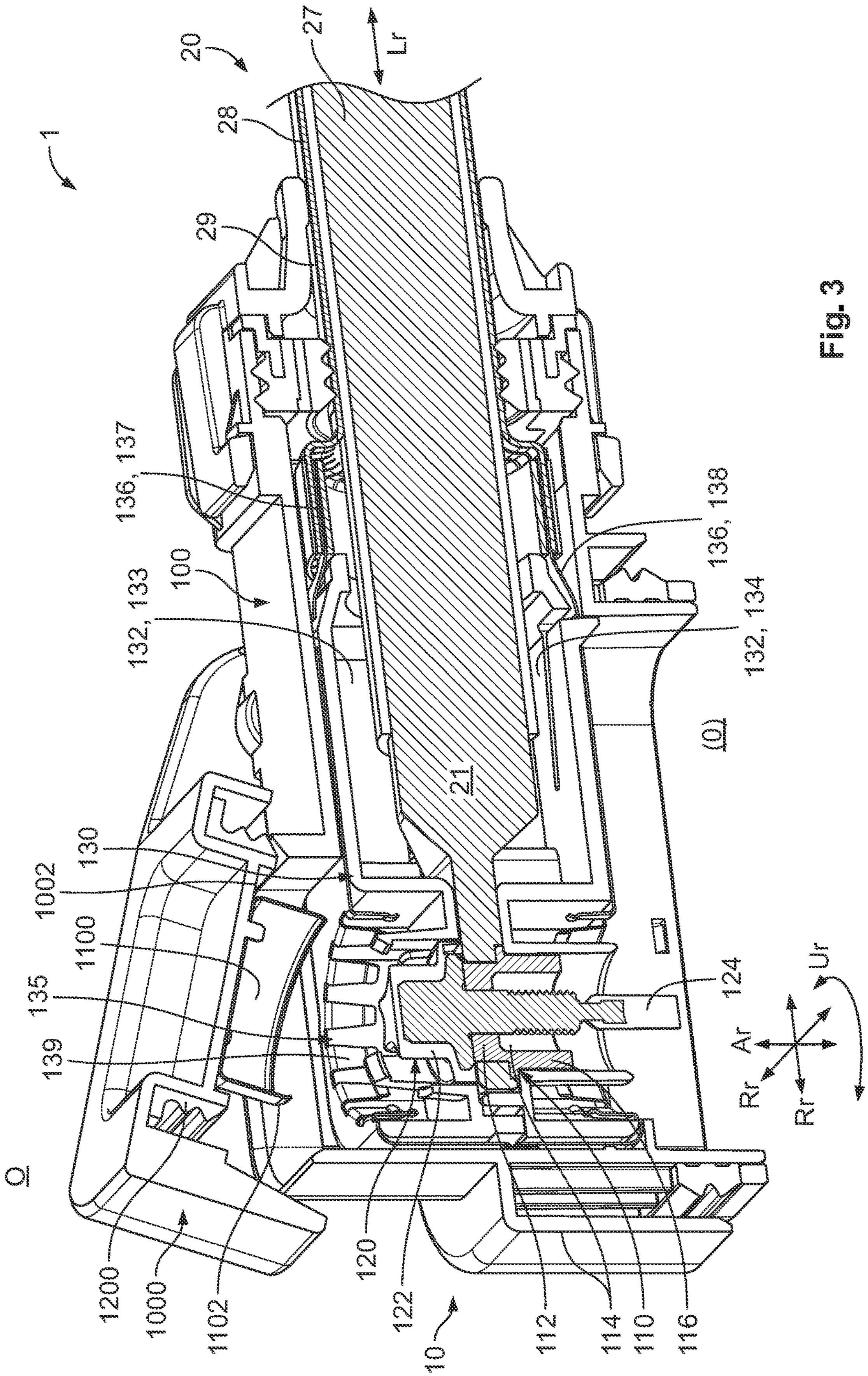
FIG. 3 shows a centrally sectioned perspective view of an assembled electrical high-current connection having a high-current connector according to the present disclosure with its protective cap in a partially open position.
Figure 4:
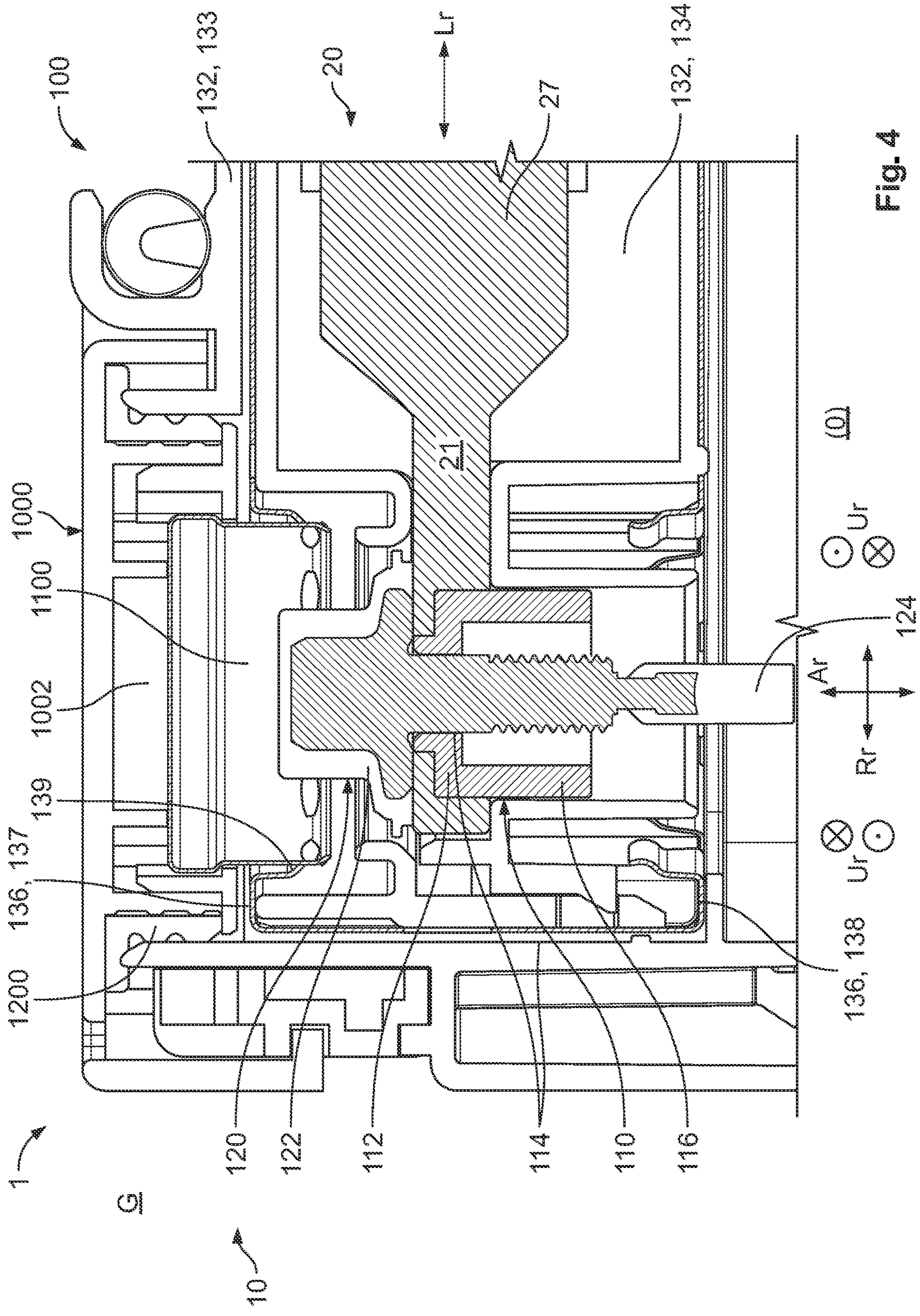
FIG. 4 shows, in a front, centrally sectioned side view which is broken away at the rear, a high-current connector according to the present disclosure (including high-current lines) with its protective cap in a closed position.
Figure 5:
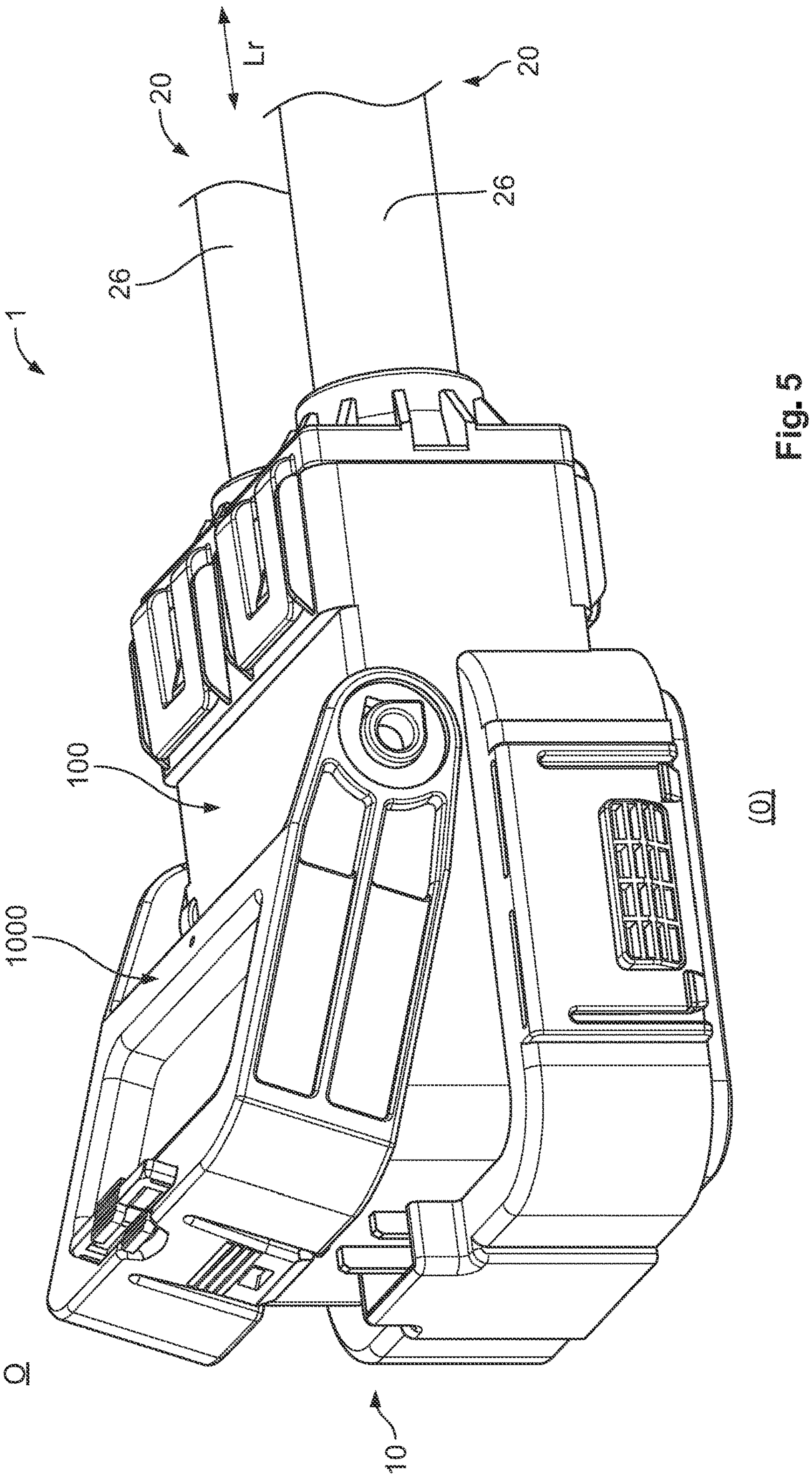
FIG. 5 shows an outer, non-sectioned perspective view of an assembled electrical high-current connection according to the present disclosure, wherein the protective cap of its high-current connector is illustrated in a partially open position.

Embodiments of the present disclosure are explained in greater detail below on the basis of three exemplary embodiments (embodiment one: FIG. 1; embodiment two: FIGS. 2 and 4; embodiment three: FIGS. 3 and 5) of a variant of a high-current connector 10 and of an assembled electrical high-current connection 1. In this case, the assembled high-current connection 1 may be in the form of a preassembled, partially assembled or completely assembled high-current connection.

Although the embodiments are described and illustrated further in greater detail by way of preferred exemplary embodiments, the invention is not restricted by the disclosed exemplary embodiments, but rather is of a more fundamental nature. Other variations can be derived therefrom and/or from the above (description of the invention), without departing from the scope of protection of the invention. The invention can be used in general in the electrical sector in the case of an entity.

The drawings show only those physical sections of a subject matter of the invention which are necessary for understanding the invention. Designations such as connector and mating connector, contact means and mating contact means etc. are to be interpreted synonymously, that is to say they are possibly interchangeable in each case. The explanation of the invention with reference to the drawings refers below to a respective axial direction Ar (axial), a respective radial direction Rr (radial) and a respective circumferential direction Ur (tangential) of a clamping screw 120, of a contact means 110, of a shielding means 1100 or of a shielding plug 1100 etc., and a longitudinal direction Lr of a relevant high-current line 20 which is preferably arranged at an angle, in particular at a right angle, with respect to the relevant axial direction Ar, that is to say the longitudinal direction Ar of the clamping screw 120.

FIGS. 3-5 show the assembled high-current connection 1 (10, 20, . . . ; 10, 20, 10) according to an embodiment having at least one high-current connector 10 and at least one electrical high-current line 20 for making contact with an electrical entity 0. For this purpose, the entity 0 has a partially complementary high-current mating connector (not illustrated) which may be arranged, for example as a plug-in socket, on the outside of entity 0. Furthermore, FIG. 1 shows the high-current connection 1 during assembly, wherein the clamping screws 120 may or may not be associated with the assembled high-current connection 1.

The high-current line 20 (see FIG. 3) preferably comprises in this case from the inside out: an electrical high-current conductor 27, electrical internal insulation, an electromagnetic shield 28 and an outer protective layer 29 (possibly in the form of electrical external insulation 29). In this case, the electromagnetic shield 28 fully surrounds the high-current conductor 27 with respect to the longitudinal direction Lr. In its free longitudinal end portion, the high-current line 20 or the high-current conductor 27 is in the form of an electromechanical contact portion 21 or contact longitudinal end portion 21.

The contact portion 21 of the high-current line 20 has an electrical contact means 110, wherein the contact means 110 may be associated with the high-current conductor 27 (as in the present case) or the high-current line 20 or the high-current connector 10. In the present case (see FIGS. 3 and 4, in particular), the contact means 110 is integrated, with its electrical connection portion 112, into the contact portion 21 of the high-current conductor 27 and is preferably welded thereto (friction, laser or ultrasonic welding). It is possible to use another electromechanical connection between the connection portion 112 and the high-current conductor 27.

The contact means 110 has an electrical contact portion 116 having a contact-making area for a mating contact-making area of an electrical mating contact means of a mating contact device or an electrical mating contact device of a mating high-current connector. The contact means 110 also has a through-cutout 114, through which a mechanical clamping screw 120 extends when making electrical contact between the high-current connector 10 and the mating high-current connector.

The high-current connector 10 can be screwed, for example by way of a threaded sleeve of the mating high-current connector, to the mating high-current connector by means of the clamping screw 120. The clamping screw 120 presses the contact-making area and the mating contact-making area against one another and in this manner establishes the electrically conductive connection between the high-current connector 10 and the mating high-current connector. In order to electrically insulate the clamping screw 120, it also preferably has only electrical insulation 122 of its head and, axially Ar opposite this, preferably has electrically insulating touch protection 124 at a free end of its screw shank.

The contact means 110 of the high-current line 20 or the contact means 110 for the high-current line 20 and the contact portion 21 of the high-current line 20 can be or are arranged in a contact device 130 of the high-current connector 10 (see FIGS. 1, 3 and 4).

The contact portion 21, including the contact means 110 (see FIGS. 3 and 4), is accommodated, in particular, in an insulation body 132 of the contact device 130, wherein the insulation body 132 is preferably configured for an individual contact portion 21. It is possible to configure the insulation body 132 for a plurality of, in particular two, contact portions of a high-current line. In the present case, the insulation body 132 has two insulation parts 133, 134 which can be or are plugged together, for example an upper insulation part 133 and a lower insulation part 134. It is possible to use a different configuration of the insulation body 132.

The insulation body 132 is surrounded by an electromagnetic shield 136. In the present case, the electromagnetic shield 136 has two shielding parts or plates 137, 138 which can be or are plugged together, for example an upper shielding plate 137 and a lower shielding plate 138. It is possible to use a different configuration of the electromagnetic shield 136. The contact device 130, and therefore both the insulation body 132 (upper insulation part 133) and the electromagnetic shield 136 (upper shielding plate 137), have an opening (through-cutout) so that the clamping screw 120 can be placed in the contact device 130.

As a result, the electromagnetic shield 136, and in particular the upper shielding plate 137, gains a necessary but undesirable shielding hole 135. In this case, the shielding hole 135 in the electromagnetic shield 136, which leads into the insulation body 132, is bounded by inwardly running spring fingers or lugs 139 of the electromagnetic shield 136. In this case, the spring lugs 139 preferably lead into an opening of the insulation body 132, in particular into a cutout or through-cutout of the upper insulation part 133.

At least one such shielded contact device 130 can be accommodated or is accommodated in an electrically insulating connector housing 100 of the high-current connector 10. In the present embodiment, there are two such contact devices 130. In addition to the connector housing 100 and the at least one shielded contact device 130, the high-current connector 10 preferably comprises at least one clamping screw 120 for mechanically bracing the high-current connector 10 (or its contact means 110) to the mating high-current connector (or its mating contact means). Use is preferably made of as many clamping screws 120 as electrical contact connections that need to be established to the high-current connector 10.

The connector housing 100 of the high-current connector 10 has an associated electrically insulating protective cap 1000 which is provided on the connector housing 100, in particular such that it can be pivoted by means of a swivel joint or hinge. However, it is also possible for the protective cap 1000 to be in the form of a protective cap 1000 that is provided separately from the connector housing 100 (not illustrated). In the first exemplary embodiment, the protective cap 1000 is in the form of a protective cap 1000 which can be pivoted towards the connector housing 100 and pivoted away again and, in the second exemplary embodiment, is in the form of a protective cap 1000 which can be plugged onto the connector housing 100 and unplugged again.

The protective cap 1000 can be brought or biased from an open position O on (one-part exemplary embodiment) or remote from (two-part exemplary embodiment) the connector housing 100 into a closed position G on/in the connector housing 100. For the closed position G, the protective cap 1000 can preferably be latched to the connector housing 100, wherein this latching is possibly securable. According to embodiments, the at least one shielding hole 139 can be closed at least electromagnetically by means of the protective cap 1000. This can be carried out by means of the protective cap 1000 itself (not illustrated) or by means of a shielding means 1100 of the protective cap 1000. In this case, the respective shielding hole 135 in the electromagnetic shield 136 of the contact device can be closed (open position O) or is closed (closed position G) by the protective cap 1000 itself and/or a relevant shielding means 1100 of the protective cap 1000. If present, the shielding means 1100 preferably protrudes from an inner side 1002 of the protective cap 1000.

In particular, the relevant shielding means 1100 of the protective cap 1000 is in the form of a shielding plug 1100 that is separate from the protective cap 1000. The shielding plug 1100 is preferably formed from a metal or a metal alloy or may be in the form of a metallized body, in particular in the form of a metallized plastic body. The shielding plug 1100 is formed such that it closes the relevant shielding hole 139 at least electromagnetically in the closed position G of the protective cap 1000 on the connector housing 100.

Referring to FIGS. 1-4, the preferably metallic shielding plug 1100 is in the form of a cylinder which is shorter than its diameter or radius and is preferably hollow and is substantially closed on an end face wall (sleeve closed on one side on an end face). The shielding plug 1100 preferably has, in its attached end portion, a circumferential bead for mounting on/in the protective cap 1000. In addition, in its free end portion, the shielding plug 1100 preferably has an insertion chamfer 1102 which is directed radially Rr inwards.

In order to accommodate the shielding means 1100 or the shielding plug 1100, the protective cap 1000 has a receptacle for the shielding means 1100 or the shielding plug 1100 on its inner side 1002. The receptacle may be formed in such a manner that the shielding means 1100 or the shielding plug 1100 can be latched and/or clipped to/in the receptacle. Other configurations of the receptacle and ways of securing the shielding means 1100 or the shielding plug 1100 to/in the receptacle can be used.

The protective cap 1000 may be in the form of a trough or partial trough, wherein its inner side 1002 is freely accessible at least in portions (that is to say in the case of a protective cap 1000 alone). In this case, it is preferred for the protective cap 1000 to have a seal 1200 on/in an inner edge extending in a substantially axial Ar manner. The seal 1200 can be used to seal the protective cap 1000 with respect to the connector housing 100.

The assembled high-current connection 1 is illustrated, in particular, in FIGS. 3-5, wherein at least one electrical high-current line 20 is connected to at least one electrical high-current connector 10. Two high-current lines 20 are connected to a single high-current connector 10, wherein the electromagnetic shield 136 shields a connecting region of the contact means 110 with the high-current conductor 27. The electromagnetic shield 136 of the high-current connector 10 is in electrically conductive contact with the electromagnetic shield 28 of the high-current line 20 (see FIG. 3). This contact preferably runs completely around the high-current line 20 on/in the contact portion 21.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. An electrical connector, comprising:

an electrically insulating connector housing;

at least one electromagnetically shielded contact device including an electromagnetic shield;

at least one clamping screw adapted to mechanically secure an electrical contact of the contact device; and an electrically insulating protective cap associated with the connector housing and selectively electromagnetically closing at least one shielding hole defined in the electromagnetic shield of the contact device.

2. The electrical connector according to claim 1, further comprising a shielding element arranged within the protective cap and electromagnetically closing the shielding hole in the electromagnetic shield of the contact device.

3. The electrical connector according to claim 2, wherein:

shielding element protrudes from an inner side of the protective cap; and the shielding hole is arranged in an outer side of the contact device and the electromagnetic shield.

4. The electrical connector according to claim 3, wherein the shielding hole is bounded by inwardly extending spring lugs of the electromagnetic shield.

5. The electrical connector according to claim 4, wherein, in a closed position of the protective cap, the spring lugs of the electromagnetic shield resiliently rest on an outer circumference of the shielding element.

6. The electrical connector according to claim 2, wherein the shielding element comprises a shielding plug discrete from the protective cap.

7. The electrical connector according to claim 6, wherein the shielding plug is secured to the protective cap by at least one of a form fit, a friction fit or a force fit.

8. The electrical connector according to claim 6, wherein the shielding plug is latched to the protective cap.

9. The electrical connector according to claim 6, wherein the shielding plug is substantially in the form of a hollow cylinder at least in portions and is closed on at least one end face.

10. The electrical connector according to claim 6, wherein the shielding plug includes:

a chamfer on a free end thereof; and a circumferential bead on an attachment end thereof for mounting to the protective cap.

11. The electrical connector according to claim 1, wherein the at least one contact device is accommodated in the connector housing.

12. The electrical connector according to claim 11, wherein the at least one clamping screw is adapted to:

secure the electrical contact of the contact device to a mating contact of a mating connector; and secure the electrical connector to the mating connector.

13. The electrical connector according to claim 1, wherein the protective cap is hingedly mounted to the connector housing.

14. The electrical connector according to claim 1, wherein the protective cap is adapted to be selectively latched to the connector housing in a closed position.

15. The electrical connector according to claim 1, wherein the protective cap is:

substantially closed on an upper end face; and substantially open on a lower end face.

16. The electrical connector according to claim 15, wherein the protective cap is:

substantially closed on a front side wall;

substantially open on a rear side wall; and substantially closed on two lateral side walls that are diametrically opposite one another.

17. An electrical connector assembly, comprising:

an electrical line; and an electrical connector, including:

an electrically insulating connector housing;

at least one electromagnetically shielded contact device including an electromagnetic shield operatively connected to the electrical line;

at least one clamping screw mechanically securing an electrical contact of the contact device; and an electrically insulating protective cap selectively electromagnetically closing at least one shielding hole defined in the electromagnetic shield of the contact device.

18. The assembly according to claim 17, wherein the electromagnetic shield shields a connecting region of the electrical contact with an electrical conductor of the electrical line.

19. The assembly according to claim 18, wherein the electromagnetic shield is in electrically conductive contact with an electromagnetic shield of the electrical line.

20. The assembly according to claim 17, wherein the electrical line is secured to the connector housing by at least one latching element.

* * * * *